Jan. 25, 1949.    N. A. GRAY    2,460,082
ELECTRIC CORD REEL
Filed Oct. 5, 1946
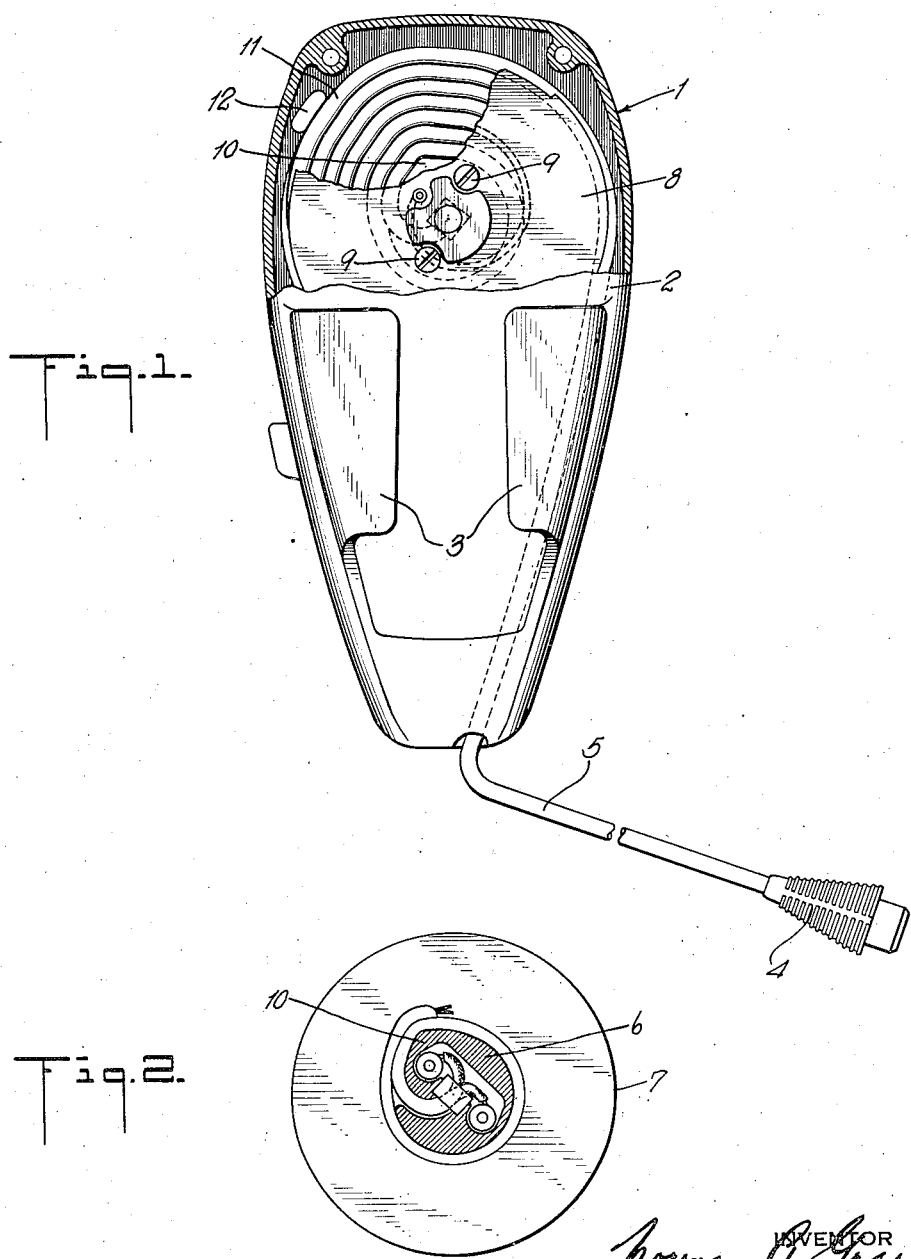

Patented Jan. 25, 1949

2,460,082

UNITED STATES PATENT OFFICE 2,460,082

ELECTRIC CORD REEL

Norman A. Gray, Stamford, Conn., assignor to Schick Incorporated, Stamford, Conn., a corporation of Delaware Application October 5, 1946, Serial No. 701,479

2 Claims. (Cl. 242—107)

The primary object of this invention is an electric cord reel adapted to receive a number of turns or wraps of rubber-covered or like cord and having provision for stopping the winding rotation of the reel after it has taken up a desired length of cord, within reasonable limits, without regard to commercial variations in diameter of the cord.

When a spring or manually wound cord reel is used to draw a length of cord into its housing, it is sometimes desirable to snub or brake the winding action before the entire length of cord has been wound on the reel. For example, in the case of a now commercially available wall bracket for electric shavers, incorporating a cord reel, the bracket proper which supports the shaver is in the form of two spaced arms separated by a front slot through which the cord passes as the shaver is lowered into or lifted out of the socket formed by the arms. In this and analogous situations it is desirable that a certain length of cord be left free, or outside of the housing, even when fully wound up, so that there will remain sufficient slack to permit the shaver to be freely inserted into and removed from the bracket. So with any cord reel housing in which it is desired to arrest the winding of the cord before the usual plug on the free end of the cord reaches the cord opening into the housing.

It has been found that supposedly uniform rubber and like cords, such as used for electric shavers, for example, vary in thickness somewhat. While the variation may be less than ten thousandths of an inch, this difference, multiplied by, say, eight or ten or however many wraps on the reel are contemplated, results in substantial differences in the over-all diameters of the fully wound reels; and if, as is the simplest method, the frictional engagement of the outer wrap of cord against its housing wall or a suitable snubbing post is utilized to arrest the winding action of the reel, the requisite over-all diameter may require, say, eight wraps of an over-size cord and practically nine wraps of an under-size cord. Since the additional wrap may represent a cord length of several inches, it is apparent that considerable variations in the length of the cord actually wound result from these different over-all diameters above mentioned. This means that with theoretically identical cords (actually varying in thickness by some thousandths of an inch) the length of cord remaining outside the housing when the cord is fully wound may vary, even in eight or ten wraps on the reel, by as much as four or five inches, depending on the dimensions of the particular device.

As will be apparent from the below-described preferred embodiment of the invention, a simple form of cord reel is herein provided which automatically effects the snubbing of the wound cord with only minor variations in the wound length, regardless of the described variations in thickness or diameter. For purposes of illustration only, the invention is shown and described with reference to the above-mentioned electric shaver wall bracket.

In the drawings, Fig. 1 is a front elevation of the bracket, broken out to show the cord reel construction; and Fig. 2 is an elevation of the reel itself, sectioned through its hub portion.

So far as the wall bracket structure is concerned, it need only be noted that it is essentially a housing, including a base 1 and a cover 2 from the front of which project the shaver supporting arms 3, the upper part of the housing enclosing a spring-wound reel for the shaver cord which emerges from the lower end of the housing and at its end carries a plug 4 for attachment to a shaver. For the reason indicated, it is desired to leave a length 5 of cord protruding from the housing even when the reel is fully wound. The cord reel in this particular structure consists of a plastic molded part (Fig. 2) comprising a hub 6 and integral flange 7, and a companion flange 8 (Fig. 1) secured to the hub by screws 9.

In this preferred form of the invention, the cord reel hub 6 is of generally circular section but is provided with means adapted to distort the applied cord to form a radially projecting hump in the successive wraps of the cord applied to the reel. As illustrated, the cord-distorting means may consist of a small hump 10 molded integrally with the hub 6.

As shown in Fig. 1, a short stretch 11 of the outermost wrap of cord is thus distorted into the form of a fast-rising cam. As will be understood, this creates a substantial difference between the over-all diameters of the wrapped cord at the lowest and highest points of the cam stretch. In the result, an outside diameter adequate for snubbing purposes, against the housing wall or otherwise, is assured within a relatively short circumferential length of the outer wrap. In other words, the number of turns required to build up a snubbing diameter is greater by only a few degrees in the case of an under-size cord than it is with an over-size cord; and, in consequence, there is little variation in the length of cord remaining outside the housing, regardless of whether the cord be under-size or over-size.

In the preferred arrangement illustrated, some point on the cam stretch 11 of the wrapped cord engages a snubbing post or projection 12 appropriately located for the purpose.

The following is claimed:

1. In a device of the character described, the combination of an electric cord reel, including a hub to receive a cord wrapped thereon, the hub incorporating means adapted to form a radially projecting hump in the form of a fast-rising cam portion in each wrap of a cord applied thereto, and stop means carried by the device in position to engage the cam portion of the outermost wrap of cord.

2. The combination of claim 1 in which said stop means comprises a snubbing post projecting into the path of the said cam portion of the outermost wrap of cord.

NORMAN A. GRAY.

REFERENCES CITED

The following references are of record in the file of this patent:

UNITED STATES PATENTS

| Number | Name | Date |
| --- | --- | --- |
| 2,222,409 | Gottlieb | Nov. 19, 1940 |